March 7, 1944. H. F. PENNEY 2,343,575
ANTIFRICTION GUIDEWAYS FOR RECIPROCABLE TOOL SUPPORTS
Filed Jan. 12, 1942 4 Sheets-Sheet 1

INVENTOR.
Harold F. Penney
Harry P. Canfield
ATTORNEY.

March 7, 1944. H. F. PENNEY 2,343,575
ANTIFRICTION GUIDEWAYS FOR RECIPROCABLE TOOL SUPPORTS
Filed Jan. 12, 1942 4 Sheets-Sheet 2
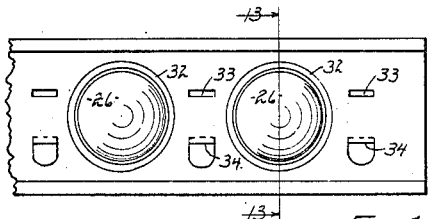
Fig.12
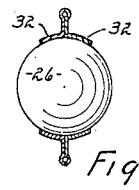
Fig.13
Fig.14
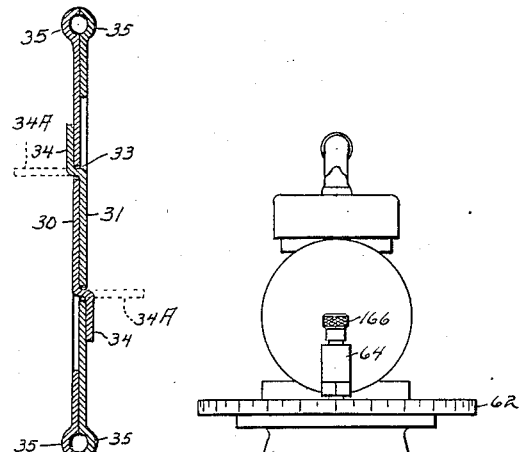
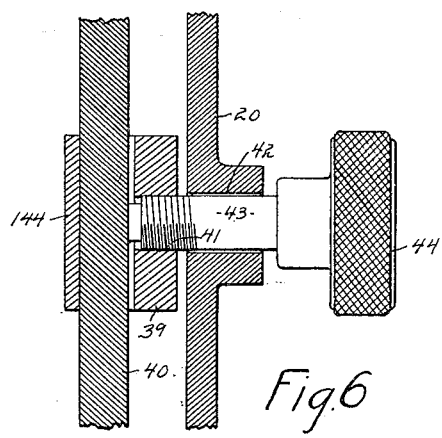
Fig.6
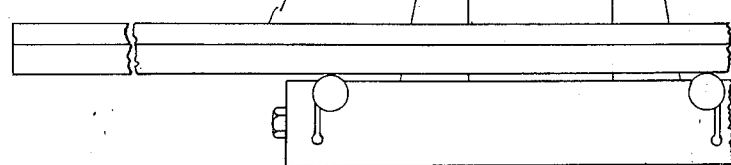
Fig.3
INVENTOR.
Harold F. Penney
BY Harry P. Canfield
ATTORNEY.

March 7, 1944. H. F. PENNEY 2,343,575
ANTIFRICTION GUIDEWAYS FOR RECIPROCABLE TOOL SUPPORTS
Filed Jan. 12, 1942 4 Sheets-Sheet 3

INVENTOR.
Harold F. Penney
Harry R. Canfield
ATTORNEY.

March 7, 1944. H. F. PENNEY 2,343,575
ANTIFRICTION GUIDEWAYS FOR RECIPROCABLE TOOL SUPPORTS
Filed Jan. 12, 1942 4 Sheets-Sheet 4

INVENTOR.
Harold F. Penney
Harry P. Canfield
ATTORNEY.

Patented Mar. 7, 1944

2,343,575

UNITED STATES PATENT OFFICE 2,343,575

ANTIFRICTION GUIDEWAY FOR RECIPROCABLE TOOL SUPPORTS

Harold F. Penney, University Heights, Ohio, assignor to Red Star Products, Inc., Cleveland, Ohio, a corporation of Ohio Application January 12, 1942, Serial No. 426,458

12 Claims. (Cl. 308—6)

This invention relates to machine tools of the type comprising a power-driven rotary tool; and has particular application to power-driven rotary tools that are variably positionable with respect to work to be operated upon.

Machine tools have been proposed of the type comprising generally a main frame and a vertical column supporting a horizontal arm which extends over a work table. The arm supports a horizontal trackway; and a motor driven rotary tool, such as a saw or the like, is supported by a carriage reciprocable along the trackway to operate on material on the work table. The trackway is mounted on the arm so as to swing on a vertical axis, and can be locked in any desired swung position, to determine the direction of movement of the carriage and saw, for example in making miter cuts; and a scale and lock are provided to accurately determine the angular position of the trackway. The saw and motor are mounted on the carriage so as to swing on a horizontal axis thereon, and may be locked in any desired angular position to determine the angle of the rotational plane of the saw or like tool with respect to the work for example in making bevel cuts; and a scale is provided to selectively determine the angle. Mechanism is provided to raise and lower the arm and tool relative to the work table and to lock them in any elevated position.

With reference to a machine tool of this general type, it is among the objects of the invention:

To provide an improved anti-friction trackway for the reciprocable tool-supporting carriage cooperating with anti-friction bearings for the carriage;

To provide improved means for locking the reciprocatory carriage against reciprocatory movement on the trackway;

To provide an improved swinging support for the trackway to adjustably position the saw or tool for mitering cuts, and a lock therefor;

To provide improved means for predetermining selected mitering angles;

To provide an improved anti-friction bearing support for a reciprocable tool of the type referred to.

Other objects will be apparent to those skilled in the art to which my invention appertains.

My invention is fully disclosed in the following description taken in connection with the accompanying drawings in which, Fig. 1 is a side elevational view of a machine tool embodying my invention as applied to a wood cutting saw;

Fig. 3 is an end elevational view of the embodiment of Fig. 1 taken from the left side thereof;

Fig. 6 is a view taken from the plane 6—6 of Fig. 4;

Fig. 12 is a view similar to a part of Fig. 1 drawn to enlarged scale, substantially full scale, and illustrating fragmentarily a ball bearing cage construction, used on the trackway;

Fig. 13 is a view taken from the plane 13—13 of Fig. 12;

Fig. 14 is a view taken from the plane 14—14 of Fig. 12 and to enlarged scale.

Figure 2:
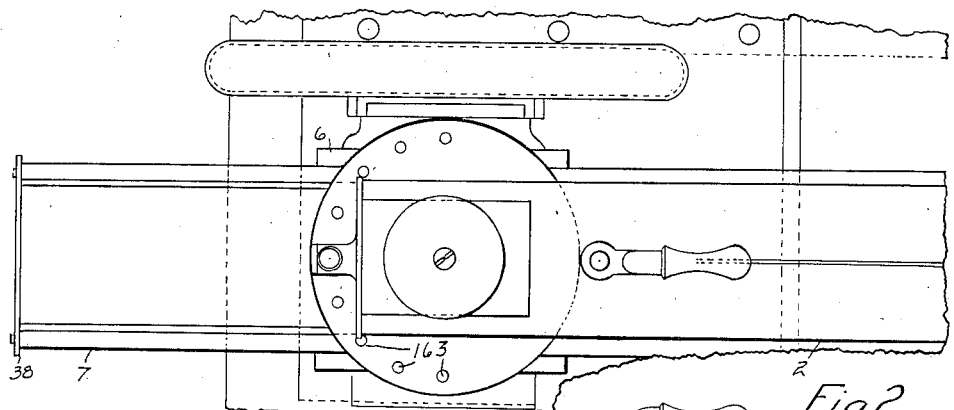
Fig. 2 is a top plan view of the tool of Fig. 1.

While my invention may be applied to various types of tools I have chosen to illustrate and describe it herein as applied to a wood or metal cutting saw.

In the drawings I have shown at 1 a work table upon which work to be sawed may be placed, and at 2 an arm extending over the table and supporting, in a manner to be described, a circular saw 3.

It will be understood of course that the arm 2 and table 1 in practice will be supported on a main frame, and that the arm 2 will be supported on the frame so it may be raised and lowered to raise and lower the saw 3 relative to the work, such parts being well-known and not constituting any essential part of the present invention, have been omitted from the drawings, and illustrative of which known parts are those illustrated and described in the patent to Ralph R. Roemer, No. 1,956,835, May 1, 1934.

Figure 1:
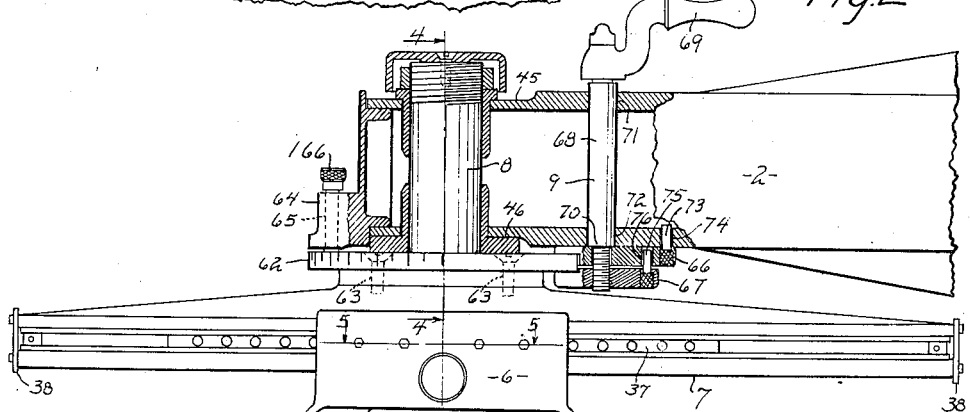

The saw 3 is rotatably driven by an electric motor 4 carried by hangers 5—5 depending from a carriage 6, the carriage being reciprocable along a trackway 7 to move the saw through work on the table 1, the bearing for the carriage 6 on the trackway 7 being of the roller or anti-friction type. The trackway has a stem 8 rotatable on a vertical axis in bearings on the arm 2 whereby the trackway may be variously positioned for making miter cuts with the saw; and at 9 generally, Fig. 1, is a locking mechanism by which the track way can be locked in any said adjusted position. The parts referred to here generally will now be described in detail.

Figure 4:
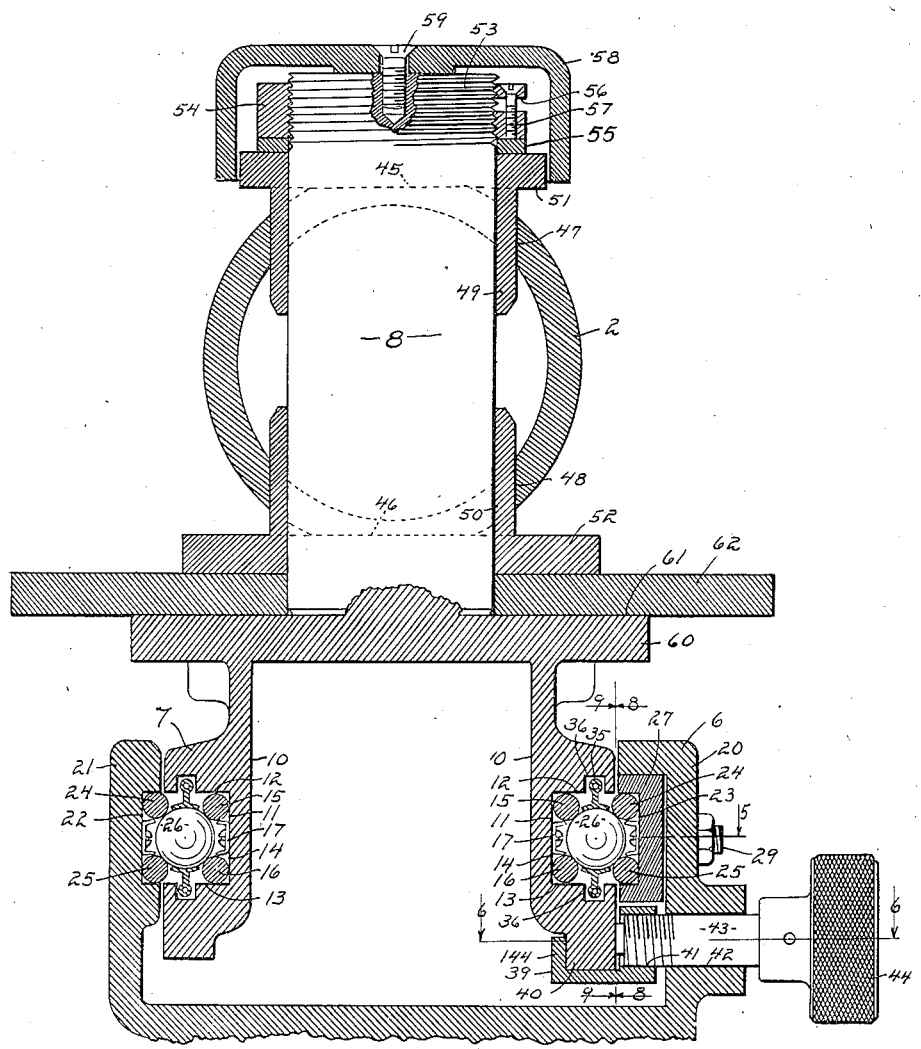
Fig. 4 is a sectional view to enlarged scale taken from the plane 4—4 of Fig. 1.

The trackway 7 has generally parallel, spaced-apart side walls 10—10, see Fig. 4, and longitudinal channels 11—11 are formed therein parallel to each other and facing convexly oppositely. The channels 11—11 have upper and lower walls 12 and 13, and back walls 14 providing two paires of diedral corner angles in each of which are disposed upper and lower bearing races 15 and 16.

Figure 7:
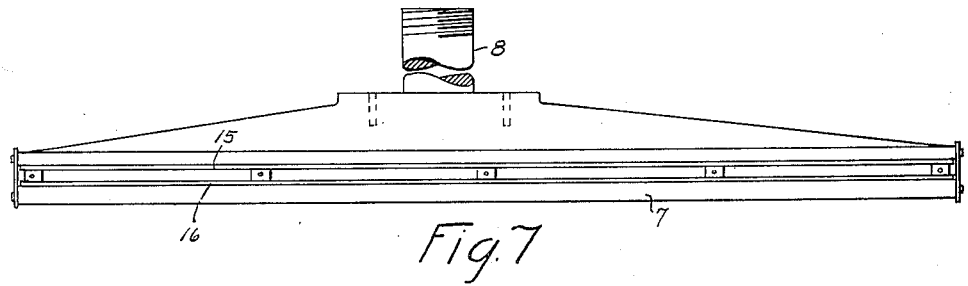
Fig. 7 is a side view illustrating separately a trackway shown assembled with other parts in Fig. 1.
Figure 8:
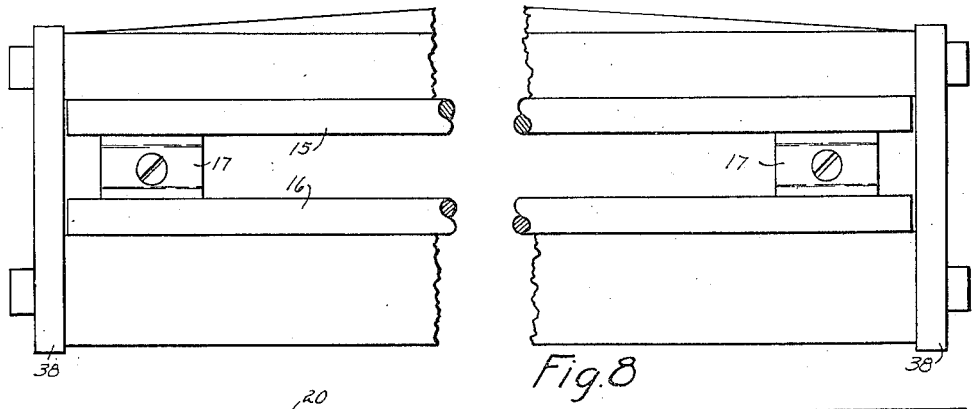
Fig. 8 is a view approximately full scale of the trackway of Fig. 7 with parts broken away to shorten the figure, and the view may be considered as taken from the plane 8 of Fig. 4, but with a ball bearing construction behind the section plane omitted.
Figure 9:
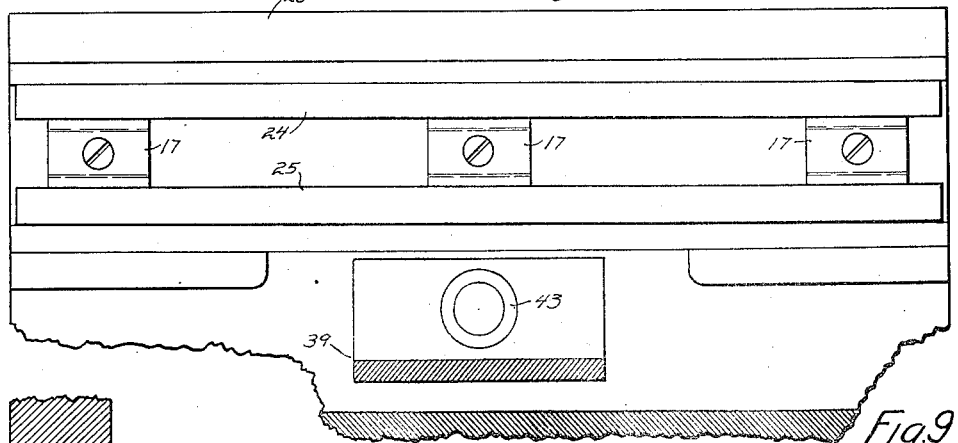
Fig. 9 is a view substantially to full scale taken from the plane 9—9 of Fig. 4 illustrating a part of an anti-friction bearing of a carriage supporting the tool.
Figure 11:
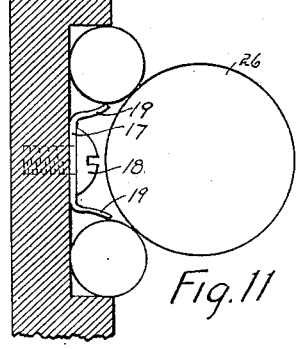
Fig. 11 is a view to an enlarged scale, larger than full scale, illustrating somewhat diagrammatically a part of the anti-friction trackway and corresponding to a part of Fig. 4.
Figure 10:
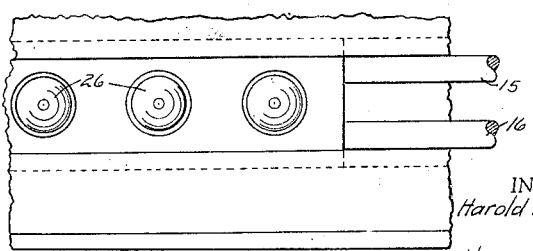
Fig. 10 is a fragmentary view, similar to a part of Fig. 1, but to enlarged scale, illustrating a part of the trackway or the tool carriage and a part of the ball bearing support for the carriage.

The races 15 and 16 are each preferably in the form of a rod, circular in cross-section, made from hardened and ground steel of any suitable alloy, and accurately of the same diameter from end to end, and straight, that is, conforming to a rectilinear axis. The race rods 15 and 16 are held in their respective diedral angles by spring clip devices 17, see Figs. 4, 7, and 11, a suitable number such as five of such clip devices, see Fig. 7, being spaced longitudinally of the trackway and of the race rods and secured upon the rear wall 14 of the said channel by screws 18; and the clip devices comprising resilient fingers 19—19 the ends of which engage respectively the race rods 15 and 16 and hold them against the walls of the said channel and in the diedral corner angles thereof.

The said walls 12, 13, and 14 of the channel 11 are accurately made preferably by machining operations so that the walls 12 and 13 are parallel to each other, and so that the wall 14 of the channel in one side wall 10 of the trackway is parallel to that in the other, whereby when the accurately formed race rods have been positioned as described, all four of them are parallel to each other.

The carriage 6 has upwardly extending walls 20 and 21 lying outside of the trackway walls 10—10, and they are provided with channels 22 and 23 confronting the channels 11—11 of the trackway, and these channels have diedral angles, and upper and lower race rods 24 and 25 therein, the construction of which may be identical with that of the channels 11 and race rods 15 and 16 of the trackway, except that they are shorter longitudinally of the trackway, inasmuch as the carriage 6 extends only part way of the length of the trackway, see Fig. 1.

The race bars on the trackway and the race bars on the carriage thus provide, as shown in cross section in Fig. 4, four rectilinear races within and upon which a plurality of bearing balls 26 roll, the balls being held in longitudinally spaced relation by a cage to be described. The race rods on the carriage engage the balls, and the balls engage the race rods on the trackway to both support the weight of the carriage and guide it for reciprocatory movement on the trackway.

The balls 26 are hardened and ground steel ball-bearing balls, and the race rods all being of hardened ground steel, and the entire bearing between the carriage and the trackway being on the engagement of said balls and race rods, a substantially frictionless carriage and trackway bearing is thus provided.

Furthermore the anti-friction bearing is renewable. If the race rods should become worn after long continued use, at their line of rolling contact with the balls, they may be turned slightly on their axes, turning thereof being permitted by the resilience of the spring fingers 19—19, and they will then present an entirely new surface to the balls. The wearing life of the race rods therefore will probably outlast the entire machine but if for any reason it be desired to replace the race rods with new ones, they may simply be detached from their spring clips by removing the clips and other rods put in their places. Similarly the balls can be renewed at any time if this becomes necessary.

Figure 5:
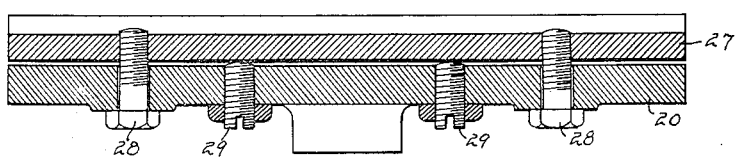
Fig. 5 is a fragmentary sectional view taken from the plane 5 of Fig. 4 or the plane 5—5 of Fig. 1 illustrating an adjustment which I may employ.

To insure a fit between the carriage and the trackway without lost motion, the aforesaid channel 23 of the carriage may be on a separate adjustable piece 27 as shown in Figs. 4 and 5. This piece is of channel form and is supported by threaded studs 28—28 projected through the wall 20 of the carriage and threaded into the web of the channel 27 whereby the channel 27 may be propelled outwardly toward the wall 20; and studs 29 are threaded in the wall 20 and abutting at their inner ends upon the web of the channel 27, whereby the channel may be propelled inwardly to take up lost motion in the anti-friction bearing. By this means, the channel member 27 may be accurately aligned with the bearing and all lost motion in the bearing eliminated as will be understood.

The cage for the aforesaid balls 26, indicated in Fig. 4, but best shown in Figs. 12, 13, and 14, comprises a pair of side plates 30 and 31 made from relatively thin sheet metal, having part-spherical sockets 32—32 pressed outwardly therefrom. The side plates 30 and 31 may be and preferably are identical. A longitudinal row of perforations 33—33 is provided on one side of the longitudinal axis of the side plates and a corresponding series of tongues 34 is provided on the other side of the longitudinal axis, these perforations and tongues being shown in Fig. 12 for one of the side plates, the tongues projecting away from the observer in that figure.

A pair of identical side plates of this nature being provided, the tongues 34 of one plate are projected through the perforations 33 of the other plate, as indicated at 34A in dotted line in Fig. 14, and the tongues are then bent downwardly over the face of the opposite plates into the positions indicated at 34—34 in solid line in Fig. 14, to fasten the plates together. Before fastening the plates together the balls 26 are trapped in the part-spherical sockets 32—32, fitting the same loosely so that they may rotate therein with negligible friction.

To stiffen the assembly thus made, the upper and lower edges of the plate may be channeled as at 35 whereby the assembled plates constitute in effect an I-section structure.

Referring to Fig. 4 the side walls 10 of the trackway are provided with grooves 36—36 in which the said upper and lower edges 35 of the cage are disposed to hold the cage in the upright position whereby the sockets 32 are held out of engagement with the adjacent race rods.

When the carriage is reciprocated along the trackway, see Fig. 1, the cage shown generally at 37, moves in general at one half the speed of the carriage 6. Removable end plates 38—38 may be bolted on the opposite ends of the trackway to limit the movement of the cage and to permit it to be inserted into the grooves 36—36.

At times in the operation of the tool, it is desirable to lock the carriage 6 against longitudinal movement on the trackway, and to effect this without binding the above-described anti-friction bearings, and independently thereof, the following means is provided, shown best in Figs. 4 and 6. A channel form or V-form piece 39, upwardly open, embraces the lower edge portion 40 of one of the trackway side walls 10, and one of the channel flanges has a threaded opening 41 therein. A smooth bore 42 is provided in one of the side walls of the carriage, for example the wall 20, and a shaft 43, threaded on its inner end, is projected through the smooth bore 42 and screwed into the threaded bore 41. A handle 44 is provided on the outer end of the shaft 43. Upon turning the handle 44 to screw the shaft inwardly, the edge portion 40 of the trackway is gripped between the flange 144 of the channel 39 and the inner end of the shaft 43. The shaft 43 is thus locked to the trackway, and the carriage is prevented from moving on the trackway inasmuch as it carries the shaft 43. It will be noted that the shaft 43 floats longitudinally in the smooth bore 42 so that tightening of the threads exerts no pressure or strain upon the carriage and trackway bearing system.

The aforesaid arm 2 is preferably tubular as shown in Figs. 1 and 4. Flat surfaces 45 and 46 are provided on the upper and lower sides of the tube. Large size perforations 47 and 48 in axial alignment are provided in these flat portions, and bushings 49 and 50 are projected downwardly and upwardly respectively through said perforations, with flanges 51 and 52 thereon engaging the flat surfaces 45 and 46.

The above-mentioned stem 8 is on the trackway 7, and the preferred construction is to cast the stem and trackway 7 all in one piece from cast metal. The stem 8 is projected upwardly through the bushings 49 and 50 and the upper end of the stem is threaded as at 53, and a nut 54 is screwed on the threads and engages the upper flange 51. Preferably a bearing washer 55 is provided between the nut and the flange. The nut 54 may be locked in any position by the well-known slot and screw arrangement shown at 56 and 57 respectively, in Fig. 4. By this means lost motion axially of the stem may be accurately removed. A cap of downwardly open cup form 58 may be mounted on the upper end of the stem 8 by a screw 59 as shown, and the skirt of the cap may cover the nut 54, etc., for neat appearance purposes and to keep out dust.

The upper side of the trackway 7 is provided with an enlargement 60 Figs. 1 and 4, having an upper flat face 61, and between the face 61 and the flange 5 a circular indexing plate 62 is disposed, rigidly connected to the enlargement 60 by screws 63—63 projecting downwardly through the circular plate and threaded into the enlargement, as indicated in Fig. 1, to rigidly attach the plate to the trackway.

The indexing plate 62 rotates with the trackway and stem 8, and is provided for determining the position of the trackway to dispose the saw at mitering positions. The indexing plate has a plurality of perforations 163 therein. A device shown generally at 64 and comprising a pin 65 having a handle or head 166 is provided on the end of the arm 2. Upon retracting the pin by manual manipulation of the head 166, the pin may be withdrawn and then the trackway and the index plate 61 may be turned to any desired position and the pin then engaged with any one of the holes 163. The holes 163 may be disposed at zero, 90 degrees, and other intermediate angular positions commonly wanted for miter cuts.

Additional means is provided to lock the indexing plate and the trackway in said positions or other intermediate positions not identified by the perforations 163, this means being shown generally at 9 and comprising a pair of clamp jaws 66 and 67 engaging the upper and lower sides of the index plate 62. A shaft 68 is rotatably mounted in aligned perforations 71 and 72 in the upper and lower parts of the tube 2 and a handle 69 is provided to turn the shaft. The lower end of the shaft is threaded into the lower jaw 67. A shoulder 70 on the shaft at its lower end and beyond the perforation 72 engages the upper side of the upper jaw 66. Upon turning the handle 69 and the shaft 68 the two jaws are drawn together and grip the index plate 62 and thereby lock it against rotation. It will be noted that the shaft 68 floats vertically in the perforations 71 and 72 so that no bending strain is applied to the indexing plate. The jaws 66 and 67 are held against rotational displacement, around the axis of the shaft 18 by a pin 73 on the upper jaw projecting into a perforation 74 in the arm 2, and by a pin 75 on the lower jaw projecting into a perforation 76 in the upper jaw.

For reciprocating the carriage on the trackway as described above, a handle 77 is provided on one of the carriage hangers 5.

My invention is not limited in all respects to the exact details of construction illustrated and described. Changes and modifications may be made and my invention is comprehensive of all of the same which come within the scope of the appended claims.

Subject matter illustrated and described herein but not claimed is being claimed in my copending application Serial Number 426,459 filed January 12, 1942.

I claim:

1. In a bearing construction for reciprocatively supporting a tool carriage on a carriage trackway, a pair of round metal rods supported on the trackway in generally vertically spaced relation, a pair of round metal rods supported on the carriage in generally vertically spaced relation and laterally spaced from the pair of trackway supported rods, a plurality of roller elements between and engaging the pairs of rods, and means comprising anti-friction bearing means to hold the carriage supported rods toward the trackway supported rods to thereby hold the pairs of rods and the roller elements in engagement, to cause the carriage to be supported against gravity by the said engagement of the pairs of rods and roller elements.

2. In a bearing construction for reciprocatively supporting a tool carriage on a carriage trackway, a pair of hardened round steel rods supported on the carriage in vertically spaced relation, a pair of like rods supported on the carriage in vertically spaced relation and laterally spaced from the pair of trackway supported rods, a plurality of linearly aligned caged balls between and engaging the pairs of rods, adjustment means to adjustably move the carriage supported rods toward and from the trackway supported rods to adjust the clearance between the rods and the balls.

3. In a bearing construction for reciprocatively supporting a tool carriage on a carriage trackway, a pair of parallel spaced-apart hardened round steel rods on the trackway, a like pair of spaced-apart parallel rods on the carriage, a plurality of balls between and engaged by the pairs of rods, and yieldable means mounting the rods to permit them to be rotated on their axes to present fresh wearing surfaces to the balls.

4. In combination an elongated trackway, two pairs of vertically spaced hardened round steel rods mounted on opposite portions of the trackway and extending longitudinally thereof with the four rods all parallel, a tool carriage below the trackway having arms extending upwardly and each carrying a pair of parallel hardened round steel rods with all four rods parallel, each pair of rods of the carriage confronting in spaced relation a pair of rods of the trackway, two series of balls between and engaging respectively the confronting pairs of rods, and a cage for maintaining the balls in spaced relation on the rods.

5. In combination an elongated trackway, two pairs of vertically spaced hardened round steel rods mounted on opposite portions of the trackway and extending longitudinally thereof with the four rods all parallel, a tool carriage below the trackway having arms extending upwardly and each carrying a pair of parallel hardened round steel rods with all four rods parallel, each pair of rods of the carriage confronting in spaced relation a pair of rods of the trackway, two series of balls between and engaging respectively the confronting pairs of rods, and adjustment means to adjustably position a pair of rods on the carriage to adjust the clearance in the ball and rod engagement.

6. In a trackway bearing an elongated trackway provided with a pair of longitudinal parallel diedral angle surfaces spaced apart, a pair of round hardened steel rods disposed in and positioned by the diedral angles, and resilient clip devices yieldably holding the rods in the angles.

7. In combination, an elongated trackway, a tool carriage, bearings on the carriage and trackway for reciprocatively supporting the carriage, the trackway being provided with a longitudinal edge portion parallel to the direction of reciprocation, a lock element having portions adjacent opposite sides of the said edge portion, one lock element portion having a threaded opening therethrough, a shaft rotatably and axially movably supported by the carriage, the end of the shaft being threaded and screwed into the opening, whereby when the shaft is rotated, the said edge portion is gripped between the threaded end of the shaft and the other lock element portion to lock the carriage against movement longitudinally of the trackway.

8. A raceway construction for supporting a reciprocatory carriage comprising an elongated trackway body, a pair of vertically-spaced, round, hardened-steel rods on each of laterally-spaced portions of the body, the body portions being provided with positioning surfaces engaged by the rods and disposing all four rods in parallel relation, and means secured to the body and detachably holding the rods upon the positioning surfaces.

9. A raceway construction for a reciprocatory carriage comprising a pair of spaced-apart carriage-supporting arms, an element adjustably movably supported on one arm, positioning surfaces on the said element and on the other arm, a pair of vertically-spaced round, hardened-steel rods on the positioning surfaces of the arm, and another pair on the positioning surfaces of the said element, the said positioning surfaces disposing the four rods all parallel, means detachably holding the rods on the said positioning surfaces, and means to adjustably move and position the said element and its associated rods toward and from the other arm and its associated rods.

10. In combination, an elongated trackway, a tool carriage, bearings on the carriage and trackway for reciprocatively supporting the carriage, the trackway being provided with a longitudinal rib portion parallel to the direction of reciprocation, locking means for the carriage comprising a clamp for gripping the said rib portion, a shaft rotatable on and axially floatingly supported by the carriage and arranged to cause the locking means to grip the said rib portion when the shaft is rotated.

11. In a bearing construction for reciprocatively supporting a tool carriage on a carriage trackway, a pair of metal rods supported on the carriage in generally vertically spaced relation, a pair of like rods supported on the carriage in generally vertically spaced relation and laterally spaced from the pair of trackway supported rods, a plurality of linearly aligned roller elements between and engaging the pairs of rods, adjustment means to relatively position the carriage supported rods and trackway supported rods by moving one pair toward or from the other pair to adjust the clearance between the roller elements and the rods.

12. In combination an elongated trackway, two pairs of generally vertically spaced metal rods mounted on opposite portions of the trackway and extending longitudinally thereof with the four rods all parallel, a tool carriage below the trackway having portions extending upwardly and each carrying a pair of parallel metal rods with all four rods parallel, each pair of rods of the carriage confronting in spaced relation a pair of rods of the trackway, two series of roller elements between and engaging respectively the confronting pairs of rods, and adjustment means to adjustably move one pair of rods toward or from another pair of rods to adjust the clearance in the roller element and rod engagement.

HAROLD F. PENNEY.